(12) United States Patent
Gomez

(10) Patent No.: US 12,289,372 B2
(45) Date of Patent: Apr. 29, 2025

(54) INTERNET OF THINGS DISTRIBUTION SYSTEM AND METHOD OF IMPLEMENTING THE SAME

(71) Applicant: Frank Gomez, Chino Hills, CA (US)

(72) Inventor: Frank Gomez, Chino Hills, CA (US)

(*) Notice: Subject to any disclaimer, the term of this patent is extended or adjusted under 35 U.S.C. 154(b) by 120 days.

(21) Appl. No.: 17/046,837

(22) PCT Filed: Mar. 12, 2019

(86) PCT No.: PCT/US2019/021925
§ 371 (c)(1),
(2) Date: Sep. 29, 2021

(87) PCT Pub. No.: WO2019/178149
PCT Pub. Date: Sep. 19, 2019

(65) Prior Publication Data
US 2024/0223656 A1    Jul. 4, 2024

Related U.S. Application Data

(60) Provisional application No. 62/641,969, filed on Mar. 12, 2018.

(51) Int. Cl.
*H04L 67/12*      (2022.01)
*H04W 28/086*   (2023.01)
*H04W 84/18*    (2009.01)

(52) U.S. Cl.
CPC ......... *H04L 67/12* (2013.01); *H04W 28/0862* (2023.05); *H04W 84/18* (2013.01)

(58) Field of Classification Search
CPC ...... H04L 67/12; H04L 9/50; H04W 28/0862; H04W 84/18; H04W 4/70; H04W 4/12; H04W 12/069; H04W 12/088
See application file for complete search history.

(56) References Cited

U.S. PATENT DOCUMENTS

| | | | |
|---|---|---|---|
| 2015/0237008 A1 | 8/2015 | Ansari et al. | |
| 2017/0060574 A1* | 3/2017 | Malladi | H04W 4/70 |
| 2017/0232300 A1* | 8/2017 | Tran | G06F 1/163 |
| | | | 434/247 |
| 2019/0230063 A1* | 7/2019 | McCready | H04L 63/08 |

* cited by examiner

*Primary Examiner* — Cheikh T Ndiaye
(74) *Attorney, Agent, or Firm* — William Fitzpatrick

(57) ABSTRACT

Internet of things distribution system and method is disclosed that utilizes blockchain ledgers. The system has a client-side component with an IoT gateway with a messaging protocol and sensors to collect data from a plurality of IoT devices. The system has access points in communication with the client-side component and a wireless mesh network composed of multiple access points, a backend component in communication with the client-side component and access point via a messaging broker, an analytics module configured to view and analyze the data collected by the sensors, and the ability to deliver the data to an existing server in a format that allows the server to distribute the IoT information in real time. A user device in communication with the backend component is configured to receive the analyzed data from the analytics module is further disclosed herein.

18 Claims, 8 Drawing Sheets

INTERNET OF THINGS DISTRIBUTION SYSTEM AND METHOD OF IMPLEMENTING THE SAME

CROSS-REFERENCE TO RELATED APPLICATION

The present utility patent application is a United States National Stage application filed under 35 U.S.C. § 371 of International Patent Application No. PCT/US19/21925 filed on Mar. 12, 2019 entitled Internet of Things Distribution System and Method of Implementing the Same, which claims the priority benefit of U.S. provisional patent application Ser. No. 62/641,969 filed on Mar. 12, 2018, entitled "Internet of things distribution system and method of implementing the same", the entirety of each being incorporated herein by reference for all purposes.

FIELD OF THE INVENTION

The present invention relates generally to methods to discover, configure and leverage relationships in Internet of Things (IoT) networks. More particularly, the present invention relates to certain new and useful advances in system architectures that can be used by business and individuals alike, wherein technology is leveraged to create a more secure, faster, safer and improved data flow across an IoT network; reference being had to the drawings accompanying and forming a part of the same.

BACKGROUND

The Internet of Things (IoT) is the network of physical devices, vehicles, home appliances and other items embedded with electronics, software, sensors, actuators and connectivity which enables these objects to connect and exchange data. While each "thing" is uniquely identifiable through its embedded computing system, it is able to interoperate within the existing Internet infrastructure.

The origins of IoT can be traced back to an idea proffered by Kevin Ashton in 1999, which focused on using radio frequency identification (RFID) technology to connect devices together. At that time, wireless networks as we know them today were still in their infancy, and cellular networks had not yet switched to a fully IP-base configuration. Thus, because RFID would not have required IP addresses or actual direct Internet connectivity for each device, it was the cheaper and more feasible solution to accomplish the IoT concept. However, the use of RFID made it harder to conceive an IoT in which all devices had unique IP addresses. Because of this, many manufacturers did not initially put much stock into an RFID-based IoT.

It was not until June of 2000 when LG introduced the world's first Internet-connected refrigerator, the LG Internet Digital DIOS, which contained a local area network (LAN) port for IP connectivity did the IoT concept truly begin to take flight. From here, the concept expanded as more applications began to appear in the real-world.

More recently, the expansion of networking capabilities, the introduction of large-scale data analytics tools, which in turn make it easier to manage and interpret data from IoT devices and the creation of new standards, such as the Allseen Alliance's AllJoyn (which make it simpler for IoT hardware and software from different vendors to interact) has driven numerous advances in the IoT such that it is now becoming a reality on a much larger scale. Now, it is common for all types of devices, from TVs to thermostats to cars, to connect to the Internet. However, the increased commonality of creating devices that are able to connect to the Internet has resulted in new issues for manufacturers.

One challenge arises from the lack of bandwidth and networking infrastructure necessary to accommodate the increased traffic that occurs when placing multiple devices onto a network. In other words, by connecting more devices to the Internet over a network, this in turn means that there will be an increase in traffic for the network pipes to process and therefore, an increase in the amount of connections network switches have to manage. One potential solution Internet service providers have come up with to address this issue is to expand the network infrastructure; unfortunately, this is a tedious, slow and costly process.

In addition, the IoT also has many issues as it relates to data security and privacy. The various devices connected to the Internet as part of the IoT not only collects personal information such as names and telephone numbers, but also information that could potential more dangerous in the event of a data breach, such as when you are home and where you are at certain times of the day. It also collects other information such as when you are eating that could be invaluable for marketers and advertisers.

As such, a need exists for implementing various technological advancements into the IoT to create new solutions that will work in conjunction with existing IoT platforms to provide a faster, safer and more secure IoT platform, while also improving the overall data flow to better leverage the data collected from each IoT device throughout the IoT platform.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In embodiments of the present invention, specific technological advancements are employed to significantly improve the security of, and optimize data flow in, an IoT platform. By improving the data flow of an IoT platform, service providers will be able to alleviate issues with systems overloading. Taken one step further, optimizing the IoT platform will also increase the integrity of the data found on an IoT platform.

In embodiments of the present invention, a system and method for connecting to IoT enabled device(s) are presented that work in conjunction with existing enterprise resource planning (ERP), Customer Relations management (CRM) and electronic resource planning (ERM) platforms to provide a faster, safer and more secure real time IoT device and second information to EPR, CRM and ERM platforms.

With regard to enterprises, this systems and methods described herein will work with existing networks and legacy networks. The system and method described herein will allow enterprises to extent important key performance indicator data for real-time analytics and also build empirical data for analysis to include predictive analytics, artificial intelligence, machine-to-machine learning, etc.

In embodiments of the present invention, the technological advancements implemented into the systems and methods described herein provide for a self-healing network that is able to detect and correct pathway and/or device errors, and that is also device agnostic.

An objective of the present invention is to provide a new and improved system and method for receiving individual IoT devices.

Another objective of the present invention is to provide a system that can organize and secure any communications received from the IoT devices.

Another object of the present invention is to provide real-time feedback on the information compiled from the IoT devices so that enterprises can make adjustments as necessary to what is being monitored through the IoT devices.

Another object of the present invention is to provide a means for providing consumers a sense of control over their personal information and the communications they receive.

Another objective of the present invention is to utilize the technological advances made in network and data processing technology to increase the efficiency and effectiveness of the system beyond what is currently possible.

Another objective is to provide a self-healing able to detect pathway and or device errors, and once detected, has the ability to reroute the pathway and/or repair the error automatically through our software protocol.

Another objective of the present invention is to provide a network that is sensing device agnostic such that if there are existing devices that need to have their signal extended and secured on the network, the software easily adapts and interfaces with most devices using API methodology.

Another objective of the present invention is to provide a network with optimal long range, e.g., 1,400 meters.

Another objective of the present invention is to provide a network that has turn-key design build.

Another objective of the present invention is to provide a network with advanced anomaly detection such that it has the ability to detect anomalies, failures, outside interference and or possible attacks with immediate notification to system administrators and technicians for immediate action.

Another objective of the present invention is to provide an easily scalable network in which to millions of devices.

Another objective of the present invention is to provide a system that enhancing existing platforms and work with large enterprise solutions.

Another objective of the present invention is to provide a GUI in a Rest/HTTP format this makes importing data into large enterprise systems seamless.

Another objective of the present invention is to help the enterprise extend important sensing KPI Data for real-time analytics and also build empirical data for analysis to include predictive analytics, AI, machine to machine learning etc.

In exemplary embodiments, a method for receiving communications from individual IoT devices is provided. The method may be implemented by operating in conjunction with existing large enterprise solutions and that, when executed, establishes a method for analyzing important data for real-time analytics. The method comprises receiving massive individual IoT device inputs, immediately organizing and securing those inputs, delivering this organized package to the existing server in a format that allows the server to distribute the IoT information at near instantaneous speeds. In sum, it also allows for a faster, more secure and robust interconnectivity of IoT devices wherein the information collected by such IoT devices can be used for real-time analytics and to also build empirical data for analysis, such as predictive analysis, artificial intelligence, machine-to-machine learning, etc.

Other features, advantages, and aspects of the present invention will become more apparent and be more readily understood from the following detailed description, which should be read in conjunction with the accompanying drawings.

DETAILED DESCRIPTION OF THE INVENTION

Figure 1:
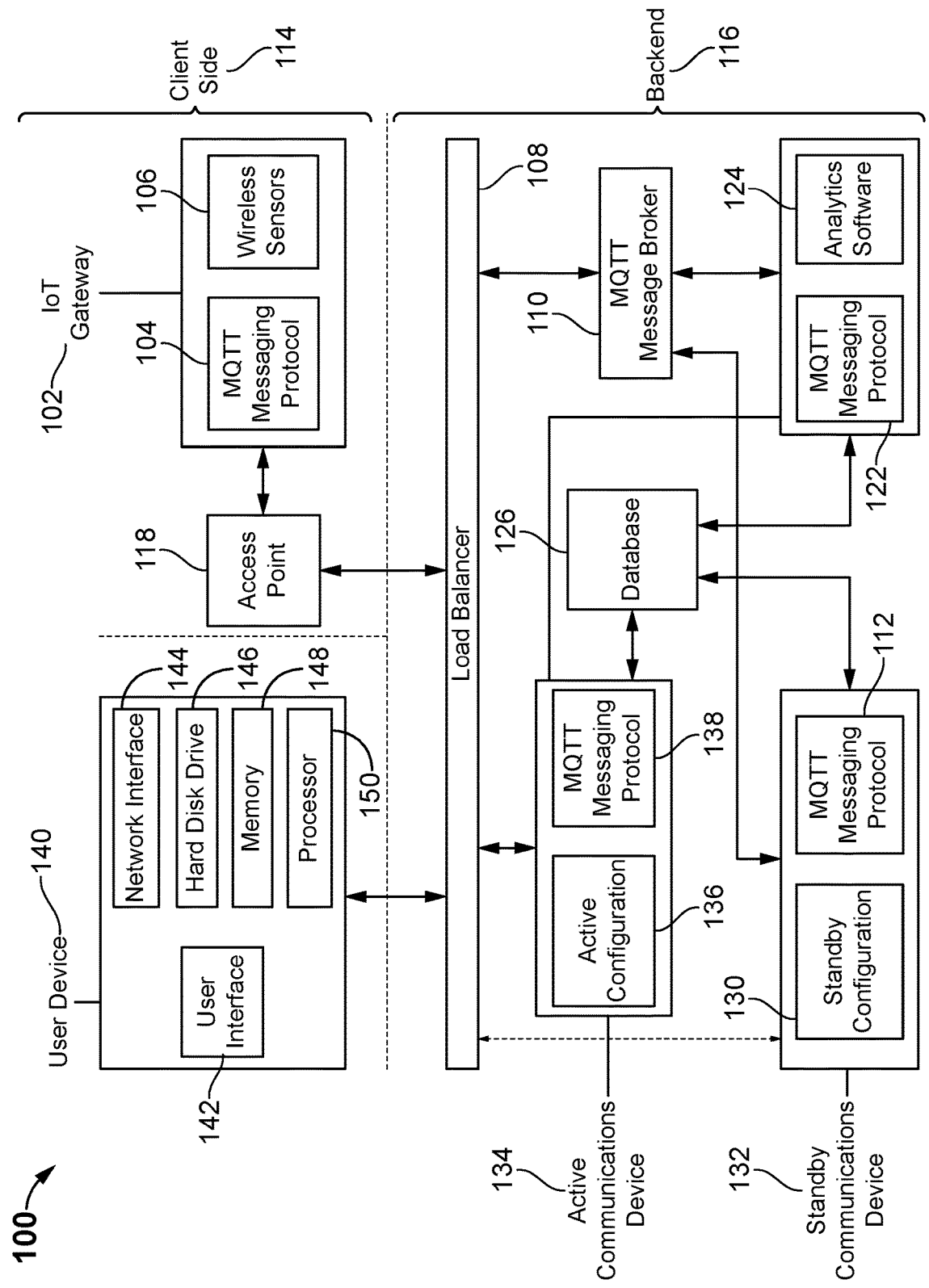
FIG. 1 is an illustration of a high-level system architecture of a wireless communication system in accordance with one embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described are shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

As used herein, the term "device" shall mean any instrumentality or aggregate of instrumentalities operable to compute, classify, process, transmit, receive, originate, switch, route, or utilize any form of information, intelligence, or data for business, scientific, control, entertainment, or other purposes. For example, a device can be a personal computer, a laptop computer, a smart phone, a tablet device, a network server, a network storage device, or any other suitable device and may vary in size, shape, performance, functionality, and price.

Furthermore, a device may include processing resources for executing machine-executable code, such as a central processing unit (CPU) or a programmable logic array (PLA), as well as one or more computer-readable media for storing machine-executable code, such as software or data.

Additional components of a device may include one or more storage devices that can store machine-executable code, one or more communications ports for communicating with external devices, and various input and output (I/O) devices, such as a keyboard, a mouse, and a video display.

As used herein, the term "enterprise" shall mean an organization that uses computers, such as corporations, small businesses, non-profit institutions, government bodies, and possibly other kinds of organizations.

As used herein, the term "Internet of Things (IoT) gateway" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT gateway may have a passive communication interface, such as a quick response code, a radio-frequency identification tag, an NFC tag, or the like, or an active communication interface, such as a modem, a transceiver, a transmitter-receiver, or the like. An IoT gateway can have a particular set of attributes (e.g., a device state or status, such as whether the IoT gateway is on or off, open or closed, idle or active, available for tasks execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT gateways may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, medical devices, etc., so long as the devices are equipped with an addressable communications interface for communicating with the IoT network. IoT gateways may also include cell phones, desktop computers, laptop computers, tablet computers, etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, fridges).

Referring now to FIG. 1, an illustration of a high-level system architecture of a wireless communication system in accordance with one embodiment of the present invention, is shown generally at 100. The network architecture consists of the client side 114 and the backend 116. In the client side 114, the IoT gateway 102 is comprised of an MQTT messaging protocol 104 as well as a wireless sensor 106. MQTT (MQ Telemetry Transport or Message Queuing Telemetry Transport) is an ISO standard that works on top of the TCP/IP protocol and is designed for connections with remote locations where a "small code footprint" is required or the network bandwidth is limited. In the current embodiment, the wireless sensor 106 is 802.11 mc, but in other embodiments it may be a different Wi-Fi system. In optional embodiments, the IoT gateway 102 may have hardwired sensors or may have sensors that are able to communicate utilizing Bluetooth technology or some other wireless network communication system. The IoT gateway 102 is also configured to utilize MQTT messaging protocol 104, which is used to facilitate communications between the IoT gateway 102 and the backend 116. As discussed below, the backend 116 is configured to utilize an MQTT message broker 110 to allow for a push/subscribe communication pattern between the backend 116 and the IoT gateway 102. The IoT gateway is configured to communicate with an access point 118, which is connected to a wireless mesh network composed of multiple access points. The access point 118 is also configured to connect to the local network via a wired connection. Both the IoT gateway 102 and the access point 118 may be configured to communicate under standard 802.11x protocols (e.g., security, authentication, transmission).

Still referring to FIG. 1, the access point 118 is also configured to communicate to the Internet via an optical communication system, such as FiOS, a cable modem, a digital subscriber line 9DSL) modem, or the like. The access point 118 may communicate with other access points and the Internet using standard Internet protocols (e.g., TCP/IP). The access point 118 is configured to communicate with the backend 116 via MQTT messaging broker 110 and will utilize a load balancer 108 to improve the distribution of incoming traffic from different access points to ensure the connection is fast and efficient. As will be discussed herein, the various modules and devices included within the backend 116 all utilize the MQTT messaging protocol to decrease footprint.

Still referring to FIG. 1, the backend 116 contains an analytics module 120, which is comprised of the analytics software 124 and the MQTT messaging protocol 122. The analytics module 120 will allow for the viewing and analysis of any data collected via the vast array wireless sensors 106. The backend 116 will also be configured to communicate with a database 126, which will store all of the information received and analyzed from the IoT gateway 102.

Still referring to FIG. 1, the backend 116 will also be configured to utilize an active/standby network configuration, as identified by the active communications device 134 and the standby communications device 132. In the current embodiment, the database 126 is configured to include two network interface controller (NIC) ports connected to the same virtual network wherein a single uplink set has uplinks in both interconnects. The uplinks in one interconnect, the active communications device 134, are active while the uplinks in the other interconnect, the standby communications device 132, are on standby and available in the event of a network or interconnect failure. In optional embodiments, the active/standby configuration may be configured through the use of separate devices (e.g., routers, firewall devices, Ethernet switches).

Still referring to FIG. 1, the active communications device 134 is configured to communicate with a user device 140, which may be used to view and analyze the information presented in the analytics module 120 and to make real time adjustments to the system that the IoT gateway 102 operates on. In the present embodiment, the user device 140 includes a central processing unit 150, random access memory 148, nonvolatile storage 146, a network interface that may include hardwired and wireless interfaces through which the user device 140 may communicate with other devices, and one or more user interface devices 142, which may include monitors, displays, keyboards, pointing devices, and any other type of user interface device. The system could be integrated with third party services, third party devices and plugins. Further, the system is incorporated with secure Blockchain ledger methodology to create an undeniable ledger of events on a Hyperledger.

Figure 2:
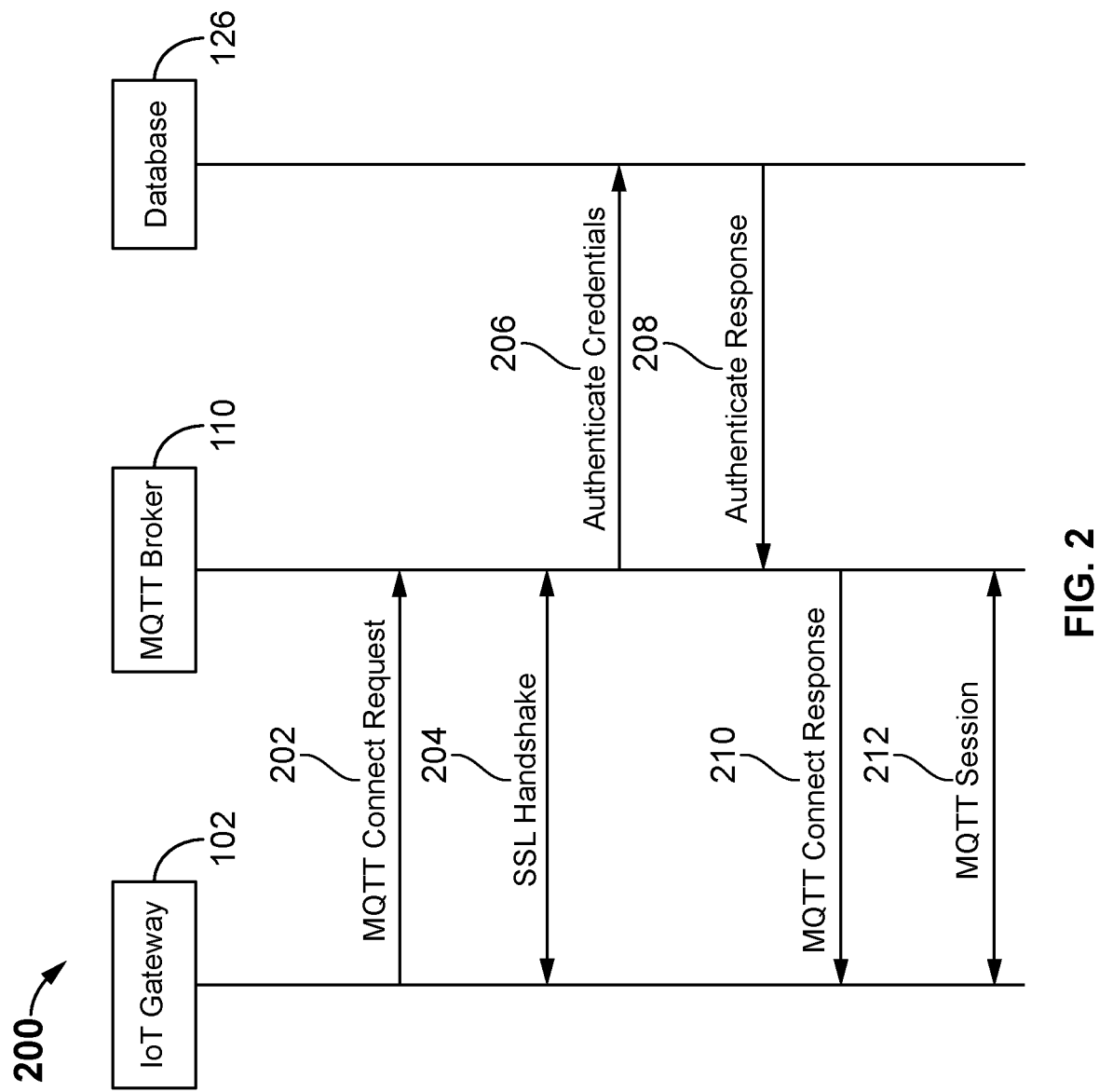
FIG. 2 is a flowchart of a gateway logging into a backend platform in accordance with one embodiment of the present invention.

Referring now to FIG. 2, a flowchart of a gateway logging into a database in accordance with one embodiment of the present invention, is shown generally at 200 and comprises the following steps: 202 the IoT gateway 102 initiates the MQTT connection by sending a MQTT connect message to the MQTT broker; 204 the IoT gateway sends an SSL handshake authentication request to the database 126 via the MQTT message broker 110; 206 the database 126 will authenticate the credentials provided in the SSL handshake 204 and judge whether or not the IoT gateway should be provided with the login processing; 208 the database will provide an authentication response 208 to the MQTT broker 204 in which the database 126 will either authenticate the IoT gateway 102 or will issue a warning that an encrypted and authenticated connection cannot be established; 210 the MQTT broker communicates the information from the database to the IoT gateway 102; 212 if the authentication is confirmed, the connection between the IoT gateway 102 and database will be established. Once established, the connection will be kept opened until either the IoT gateway 102 sends a disconnect command or it loses the connection.

Figure 3:
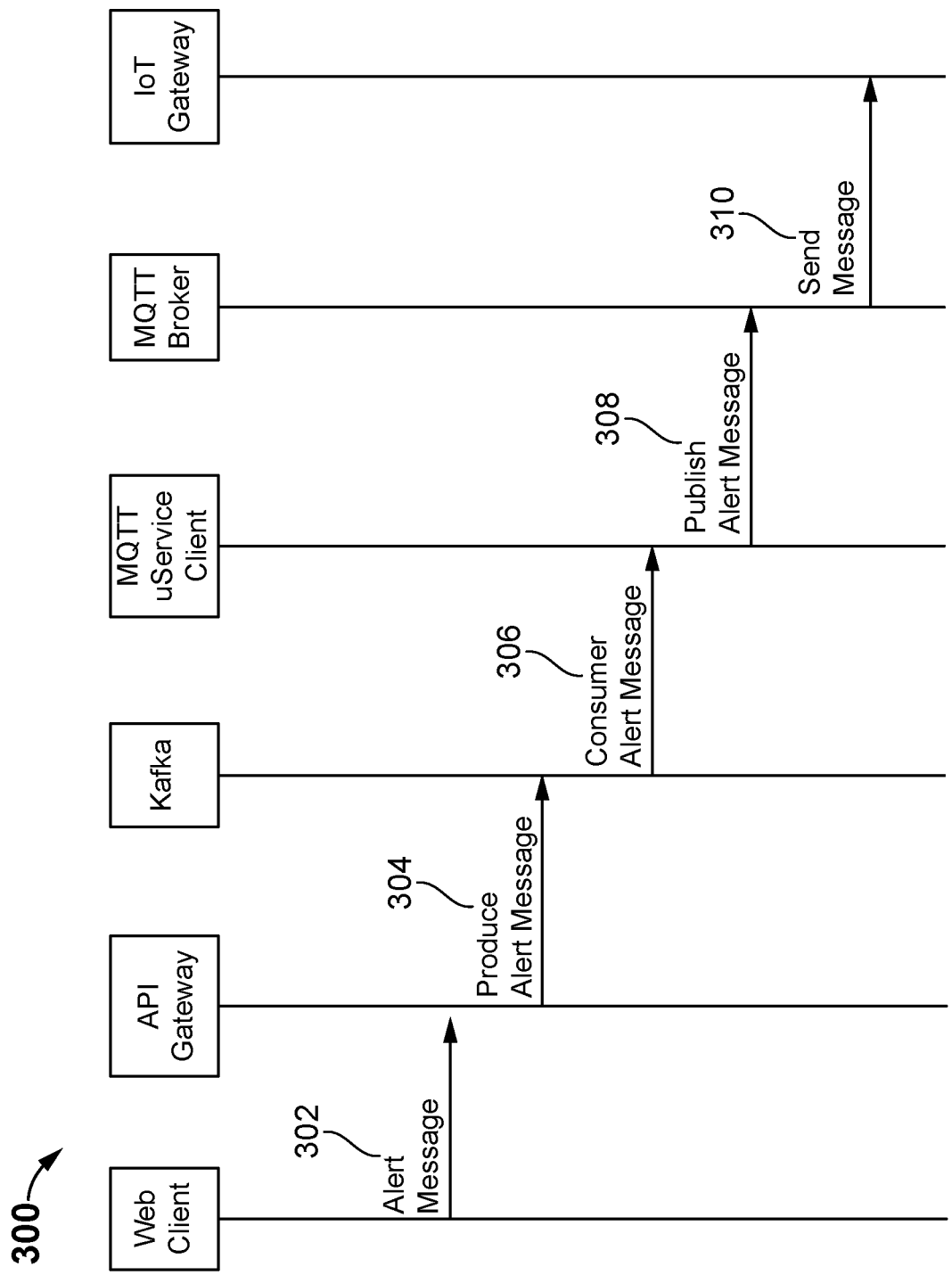
FIG. 3 is a flowchart of an operator device sending an alert to an IoT gateway in accordance with one embodiment of the present invention.

Referring now to FIG. 3, an exemplary flowchart of an operator device sending an alert to an IoT gateway in accordance with one embodiment of the present invention, is shown at 300 and comprises the following steps: At step 302 the web client issues an alert message via the API gateway; at step 304 the API gateway receives the message and routes the request to the Kafka publish-subscribe messaging system; at step 306 the kafka publish-subscribe messaging system then pushes the message to the MQTT Micro-service Client; at step 308 the alert message is then published to the MQTT Broker; 310 the MQTT broker sends alert message to the IoT gateway 102.

Figure 4:
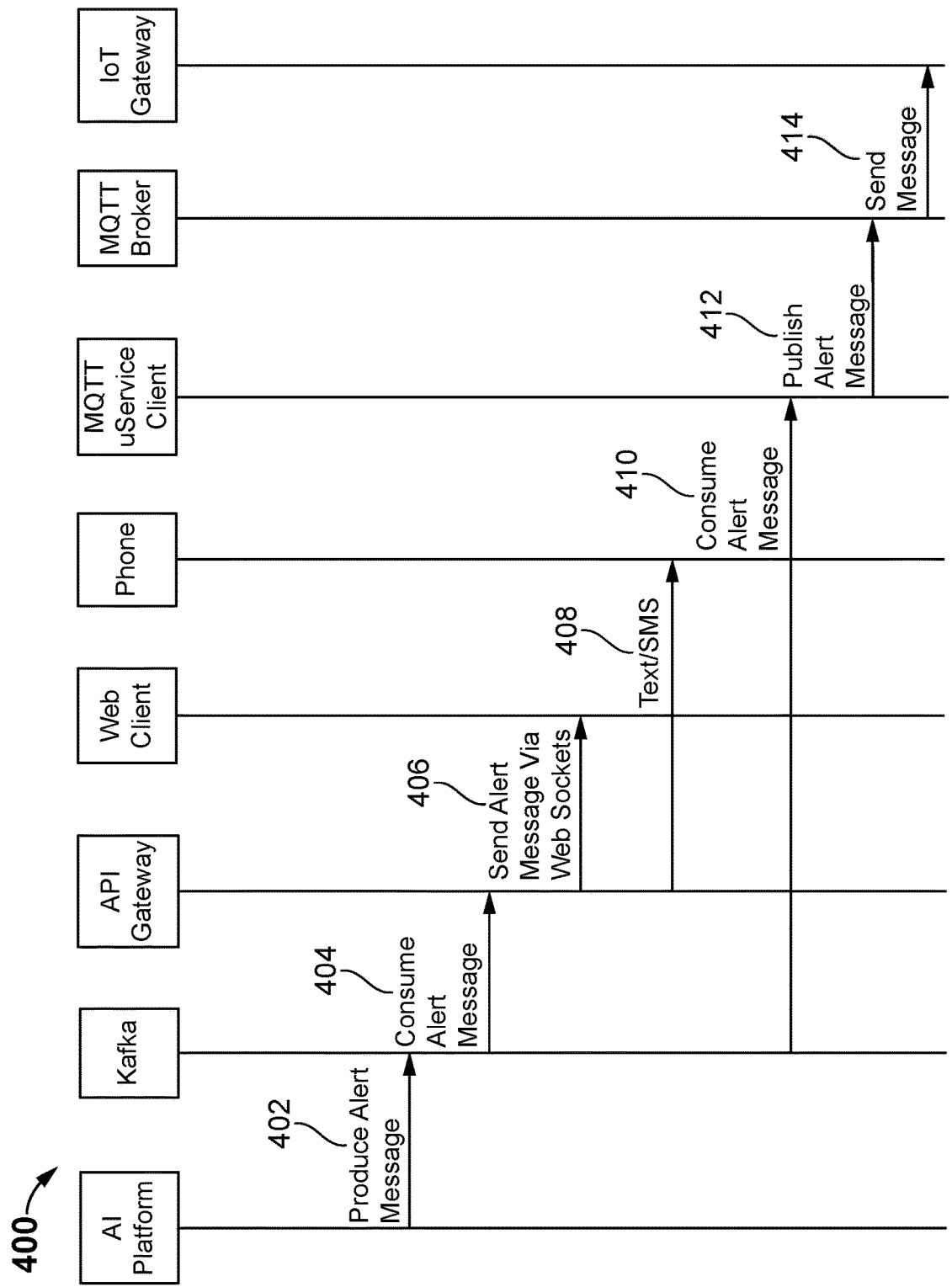
FIG. 4 is a flowchart of a platform sending an alert to an IoT gateway in accordance with one embodiment of the present invention.

Referring now to FIG. 4, an exemplary flowchart of a platform sending an alert to an IoT gateway in accordance with one embodiment of the present invention, is shown at 400 and comprises the following steps: At step 402 the AI platform produces the alert message to the Kafka publish-subscribe messaging system; at step 404 the kafka publish-subscribe messaging system then consumes the alert message and sends it to the API gateway; at step 406 the API gateway then sends the alert message via web sockets to the web client; at step 408 the API gateway also sends text/sms message to the phone; at step 410 the kafka publish-subscribe messaging system consumes the alert message and pushes it to the MQTT Micro-service Client; 412 the MQTT Micro-service client publishes the alert message to the MQTT broker; 414 the MQTT broker then sends the message to the IoT gateway.

Figure 5:
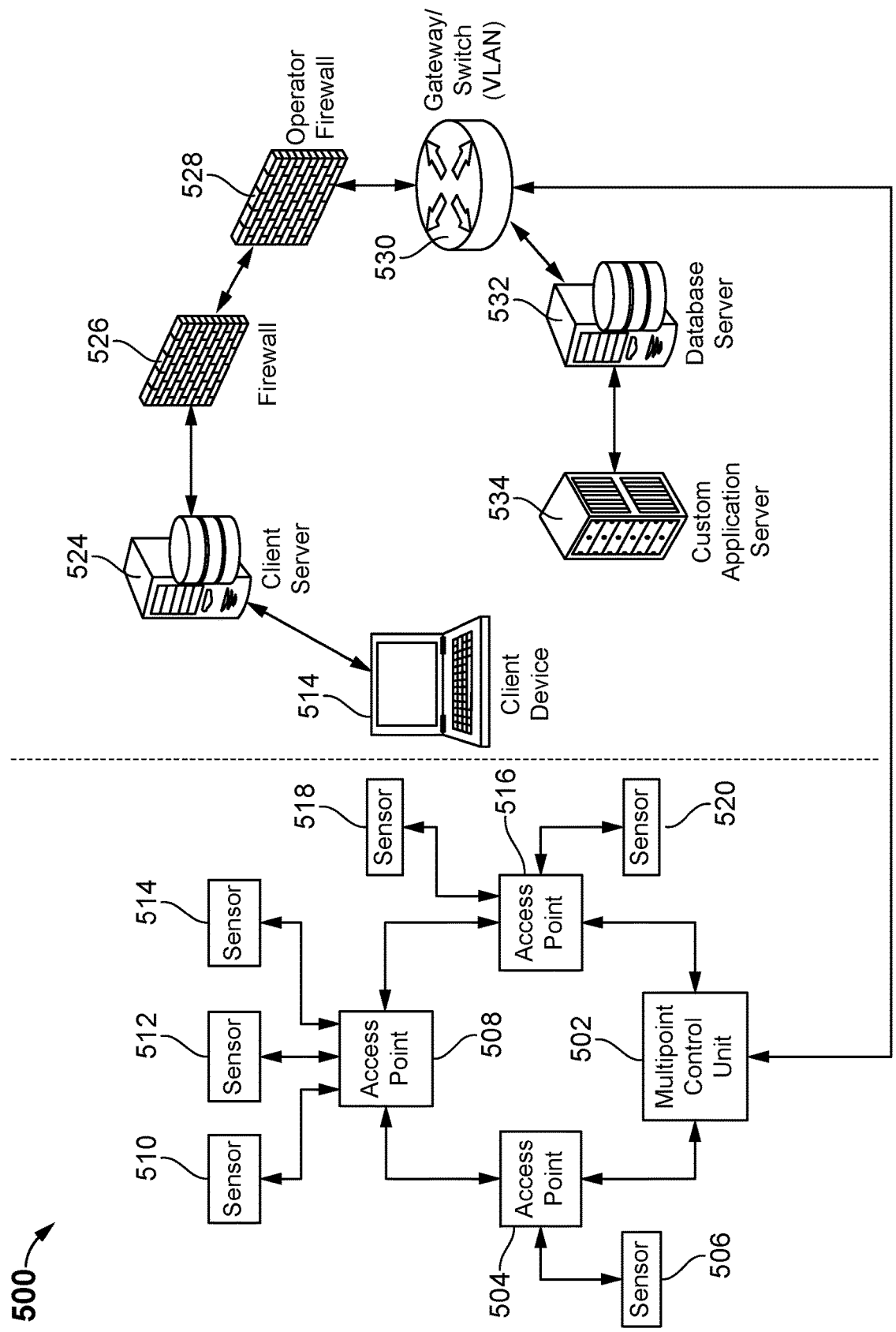
FIG. 5 is an illustration of an external mesh network architecture in accordance with one embodiment of the present invention.

Referring now to FIG. 5, an illustration of an external mesh network architecture in accordance with one embodiment of the present invention, is shown generally at 500. One embodiment of the mesh network contemplated for use in this invention is presented in 538. In the current embodiment, the mesh network consists of three different access points 504, 508 and 516, each of which are configured to communicate with a varying number of sensors. Specifically, access point 504 connects to sensor 506; access point 508 connects to sensors 510, 512, and 514; access point 516 connects to sensors 518 and 520. The multipoint control unit 502 acts as the central gateway for all of the access points 504, 508 and 516. In optional embodiments, the mesh network may consist of more than or less than three access points.

Figure 6:
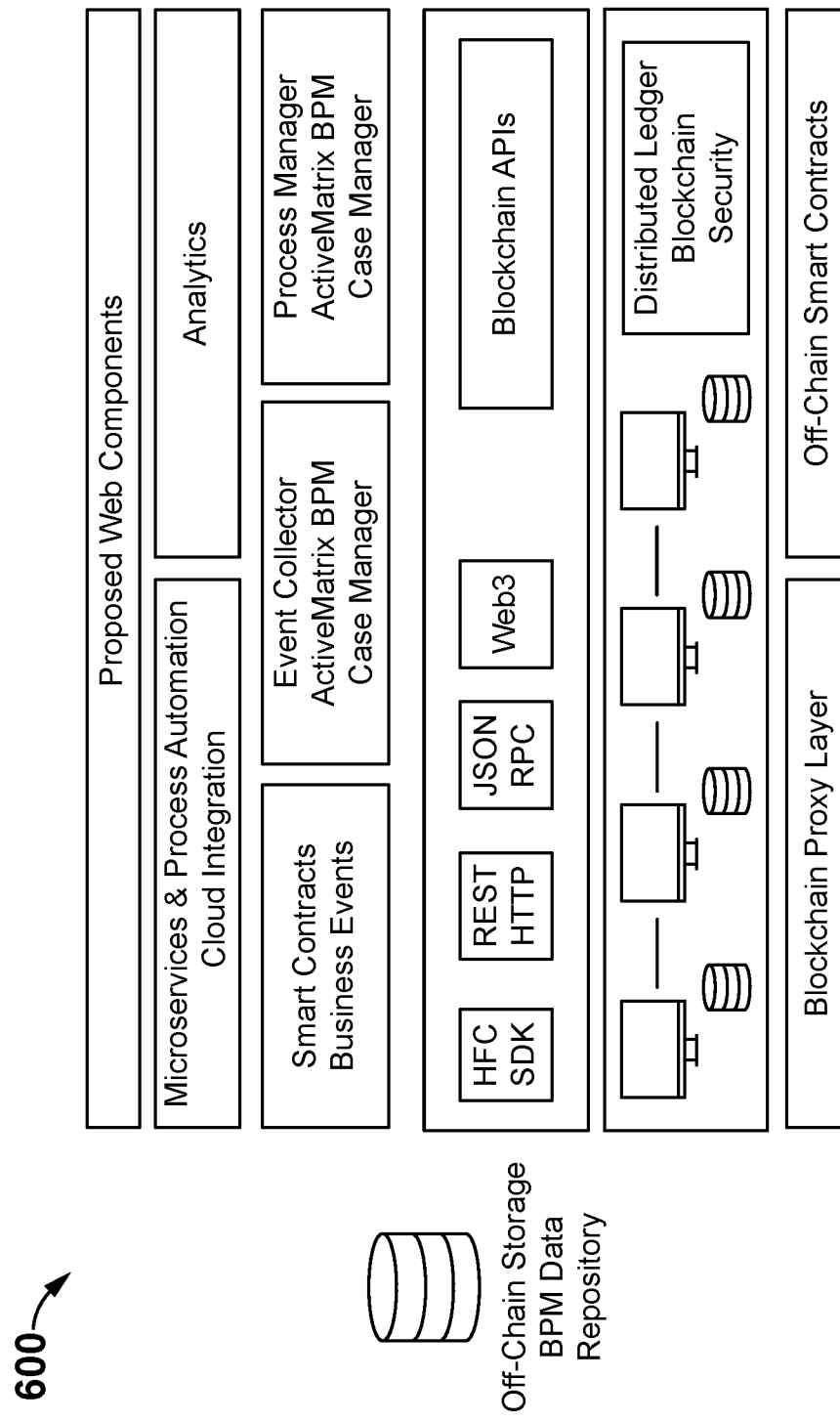
FIG. 6 is an illustration of the system implemented utilizing blockchain technology in accordance with one embodiment of the present invention.
Figure 7:
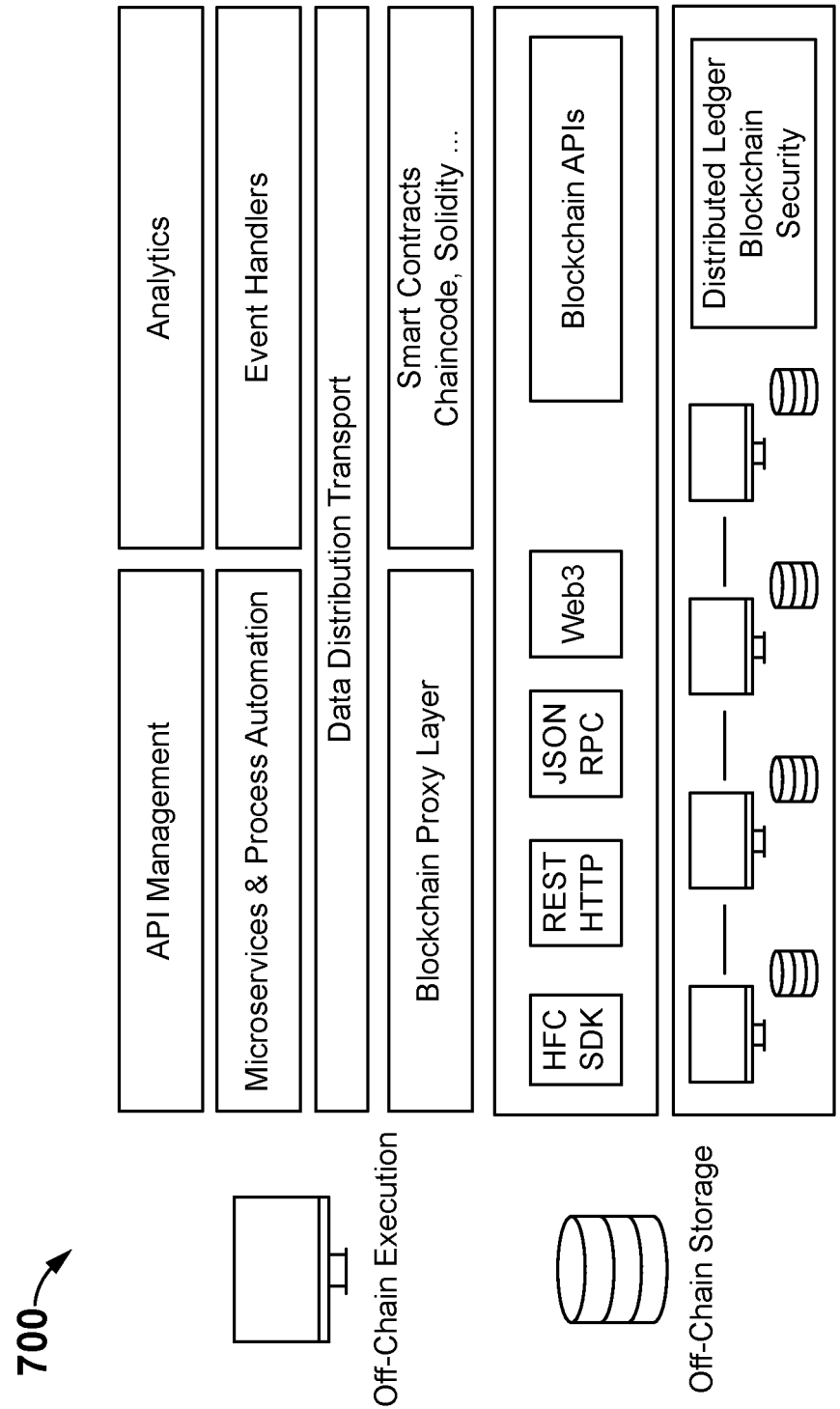
FIG. 7 is an illustration of the system implemented utilizing blockchain technology in accordance with another embodiment of the present invention.

Still referring to FIG. 5, the gateway/switch 530 allows for different devices to connect to the mesh network 538. In the current embodiment, a client device 522 is configured to communicate with the client server 524, which is used to access the mesh network 538 via the gateway/switch 530. In order to access the gateway/switch 530, however, the client server 526 must be secured through both the client firewall 526 and the operator firewall 528. In addition, the customer application server 534 is configured to communicate with the database server 532, which is also connected to the mesh network 538 via the gateway/switch 530. FIG. 6 is an illustration of an environment 600 of the system implemented utilizing blockchain technology in accordance with one embodiment of the present invention. FIG. 7 is an illustration of an environment 700 of the system implemented utilizing blockchain technology in accordance with another embodiment of the present invention. The system could be integrated with third party services, third party devices and plugins. Further, the system is incorporated with secure Blockchain methodology to create an undeniable ledger of events on a Hyperledger.

Indeed, in today's age of big data, the system and method according to the present invention are configured to manage and connect multiple different software and hardware systems. This is achieved through API's, which are integration touchpoints for connecting multiple systems, however they are weak points of a system and are exposed. The weak points are compensated by Blockchain technology that locks down the API and keeps the architecture of the system safe. All data is hashed and stored in blocks on a chain. This chain makes it easy to see the data flow and identify every user who has or has had access to that specific data. This also allows for advanced analytics for not only the data itself but for its path across the network. With blockchain methodologies, the system and method according to the present invention take control of your data privacy and ensure the right people have access to the required information and prevent others from gaining access.

EXAMPLE 1

In operation, the network described herein is useful for a myriad of different vertices. One exemplary vertical is an assisted living home.

The network discussed above may be integrated as an assisted living resident and staff monitoring platform, providing real time information and alerts to staff, KPI reporting to management, and patient KPI reporting to family members. The network can communicate reliably and securely using hardware capable of operating in critical and emergency situations and utilize AI to intelligently monitor and store patient and staff status over time, trigger appropriate and actionable alerts, and allow for KPI reporting and event replay. The system will integrate with other systems by way of its built-in Enterprise Service Bus (ESB) and is capable of measuring a number of patient parameters and storing those in a database, distilling the data and monitoring in real-time soft or hard alerts to staff as well as provide management-level reporting.

All communication between IoT devices is handled over the dedicated mesh network to reduce traffic on existing networks and maintain a secure environment. Some variables which may be tracked, distilled, monitored and communicated are as follows: Patient tracking including patient speed, acceleration, and location; Environmental tracking including temperature and humidity; Alert devices including fall alerts and sedentary alerts, and battery life alerts and unauthorized access alerts; and Monitoring wetness for bed wetting or expulsion of bodily fluids as one further example.

The IoT device will have built in shock resistance to protect from drops and fall, and will also have an accelerometer that will be used to detect falls, as well as monitor body orientation. The IoT device will have a temperature sensor that can track ambient temperature of the device and will also track location of an individual. The IoT device will also have a single button for ease of usability that when pressed, will send information to the database and alert staff through the user interface of the location of the device and the time the message was sent; when pressed, the IoT device will also make a voice connection with a currently on duty staff member. In practice, a staff member would answer the call and initiate the voice communication, wherein the resident and staff member would then have a two-way conversation that will end once the staff member terminates the call. The communication button while be large and easy to press, but not by accident.

The IoT device will communicate under standard 802.11x protocols (i.e. Security, authentication, transmission, etc.) and will utilize a rechargeable battery that provides power for a minimum of two (2) days under normal operating conditions. The battery will be rechargeable via a USB-C connection. The IoT device will be housed within a case that will be small and discreet, appearing "non-medical". The case will be anchored to the user with a removable lanyard and a discrete clip. The IoT device will communicate using WiFi or cellular communication selectively. More specifically, the IoT device must communicate wirelessly and switch communications between WiFi and cellular as it moves in and out of the local network.

The IoT device must store local data in the event the network is unavailable through WiFi and cellular. Finally, the IoT device will have removable components that are clearly labeled as to allow for easy replacement of any faulty or defective components. For example, the IoT device could be in the form of an incontinence device integrated into a bed that will directly connect to the AP via Bluetooth Low Energy. In this example, IoT device must be able to detect moisture, be easy to clean, sanitize and reuse, and should not be invasive.

Figure 8:
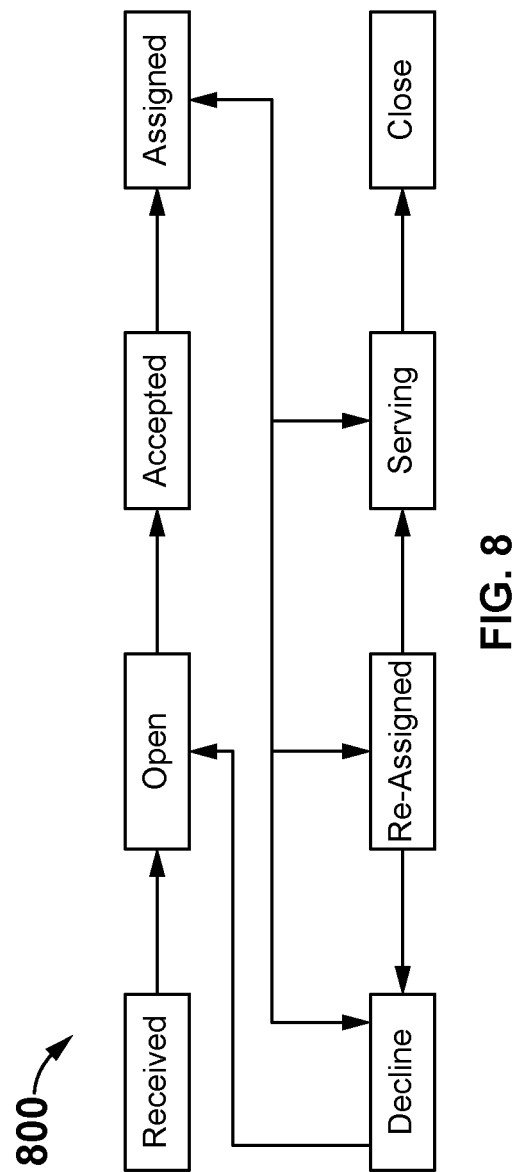
FIG. 8 is an illustration of life cycle of an event in a system incorporated with blockchain in accordance with one embodiment of the present invention.

The access point (AP) connects to the wireless mesh network that is comprised of multiple AP devices. The AP will also be able to connect to the local network of the living facility via standard RJ45 network cables. The AP will be designed to operate at the commercial grade operating temperature and will be powered by direct power, either through a standard power jack or Power over Ethernet, with a backup battery in the event of a power failure. The AP will communicate under standard 802.11x protocols (i.e. Security, authentication, transmission, etc.). The AP will be mountable on the wall as well as the ceiling and will track the location of other APs within a defined range inside the assisted living facility. The AP will support a variety of external environmental sensors through an industry standard terminal block. As the market shifts towards the digitization of care delivery and more personalized treatment, a secure and connected healthcare IT ecosystem to manage patient information becomes of paramount importance. Healthcare data is a high value target for theft. With this information, victims could very quickly have their identity stolen. Healthcare organizations are also frequently extorted for money through ransomware. In embodiments of the present invention, the Blockchain powered by the system locks down high value patient data and authenticate its path in every step of treatment. An event, alarm, or trigger on the system according to the present invention has a distinct life cycle 800, as shown in FIG. 8. The event changes in each phase and blockchain technology could be used to securely process, store, and track this information.

In embodiments, devices are assigned to residents or attached to facilities at a residential facility/assisted living/nursing home. At step 802, at the start, an input is received. Event Triggered by Device (STATE=RECEIVED). This step comprises event triggering and event monitoring using the system, which that an event is triggered from these devices whenever an incident occurs. Incidents could be of different types like fall, temperature change, wetness alert and the like, each being classified into critical alerts and warnings. When an event is triggered, the server records the timestamp (device timestamp) of event trigger, received timestamp (server), event type, client id, company id, meta and location information related to an event.

At step 804 Event Notified to Users Through Different Channels (STATE=OPEN) is implemented once the event is processed and stored, it is dispatched to caretakers/staffs through various channels such as web sockets, SMS, email for sending notifications from staff to patients or staff to staff, or provider to staff.

At step 806, an event is Accepted/Acknowledged by the User (STATE=ACCEPTED) followed by step 808 (STATUS=ASSIGNED). An event is accepted by an available staff at the facility. Staff who have accepted the event may attend to the incident. Staff who have already accepted another event cannot accept new event until the old event is completed, each being recorded in the blockchain.

In some instances, staff may decline step 810 which is marked as Event Declined by the User (STATE=DECLINED) followed by (STATE=OPEN) step 804.

The system is then configured Event Re-assigned to Different User (STATE=REASSIGNED). At any point the user could re-assign an event to a different user. The system is configured to notify the status update to all online caretakers/staffs. If a staff member has accepted an event but is unable attend it, he/she could decline at any time. This would change the state of the event to open. A status update would notify all online caretakers/staffs. Each instance is recorded using Blockchain.

At step 814, the Event Attended by User (STATE=SERVING). The event in progress represented by a state 'serving', which demarks the staff attending to the instance.

At step 816, the Event is marked Completed by Use (STATE=COMPLETED) The completed event could be marked by the staff as 'completed'. False alarm can be reported by staff at this point.

Each of the events are archived via blockchain; Event Archived (STATE=ARCHIVED) and is stored in a secure archival database.

Specific configurations and arrangements of the invention, discussed above regarding the accompanying drawing, are for illustrative purposes only. Other configurations and arrangements that are within the purview of a skilled artisan can be made, used, or sold without departing from the spirit and scope of the invention. For example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures.

While the present invention has been described in connection with what are presently considered to be the most practical and preferred embodiments, it is to be understood that the present invention is not limited to these herein disclosed embodiments. Rather, the present invention is intended to include the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including," "comprising," "having," and "with" as used herein are to be interpreted broadly and comprehensively, and are not limited to any physical interconnection. Moreover, any embodiments disclosed herein are not to be interpreted as the only possible embodiments. Rather, modifications and other embodiments are intended to be included within the scope of the appended claims.

I claim:

1. An internet of things (IoT) system comprising:
    a client-side component comprising an IoT gateway having a messaging protocol and one or more sensors to collect data from a plurality of IoT devices;
    at least one access point in communication with the client-side component, wherein the access point is connected to a wireless mesh network;
    a backend component in communication with the client-side component and the access point via a messaging broker, wherein the messaging broker comprises:
        an analytics module configured to view and analyze the IoT data collected by the sensors and further configured to deliver the data to an existing server in a format that allows the server to distribute the IoT data in real time;
        one or more database configured to store the analyzed data of the IoT gateway;
        wherein the database comprises at least two network interface controller (NIC) ports connected to a same virtual network, and further comprises an uplink set including a first uplink and a second uplink in both interconnects;
        wherein the first uplink is an active communications device and is active while the second uplink in the other interconnect is a standby communications device is on standby and available in an event of a network or interconnect failure;
    a user device in communication with the backend component is configured to receive the analyzed data from the analytics module;
    wherein the backend component is in communication with a blockchain ledger to create a ledger of IoT data.

2. The system of claim 1, wherein the backend component comprises an active configuration and a standby network configuration.

3. The system of claim 2, wherein the active network configuration comprises an active communication device.

4. The system of claim 3, wherein the active communications device is in communication with the user device, and is further is configured to view and analyze information presented in the analytics module and further configured to make real time adjustments to the system.

5. The system of claim 2, wherein the standby network configuration comprises a standby communication device.

6. The system of claim 1, wherein the messaging broker is a MQTT messaging broker.

7. The system of claim 1, wherein the messaging protocol is a MQTT messaging protocol.

8. The system of claim 1, wherein the access point is configured to connect with a local network.

9. The system of claim 1, wherein the backend component comprises a load balancer configured to improve a distribution of incoming traffic from the one or more access points to ensure a connection is fast and efficient.

10. The system of claim 1, wherein the active communications device and the passive communications device is configured to integrate with third party services, third party devices and plugins.

11. The system of claim 1, is implemented utilizing the blockchain ledger to create a ledger of events on a hyperledger.

12. A method for IoT communication over an aggregate of instrumentalities, the method comprising:
    receiving one or more input data from a plurality of IoT devices at a client-side component via an IoT gateway including a messaging protocol and one or more sensors;
    analyzing and organizing the received inputs at a backend component in communication with the client-side component and access point via a messaging broker;
    delivering the input data to an existing server in a format that allows the server to distribute the IoT data in real time;
    providing database, wherein the database comprises at least two network interface controller (NIC) ports connected to a same virtual network, and further comprises an uplink set including a first uplink and a second uplink in both interconnects, wherein the first uplink is an active communications device and is active while the second uplink in the other interconnect is a standby communications device is on standby and available in an event of a network or interconnect failure;
    delivering the organized input data to an existing server in a format that allows the server to distribute the IoT information in real time to a user device;

ledgering IoT data on a blockchain in communication with the backend component.

13. The method of claim 12, wherein the input data from the IoT devices is used for real-time analytics and to build empirical data for analysis.

14. The method of claim 12, is configured to integrate with third party services, third party devices and plugins.

15. The method of claim 12, further comprising utilizing a blockchain to create a ledger of events on a hyperledger.

16. The method of claim 12, wherein the client-side component is in communication with one or more access points, wherein the one or more access points are connected to a wireless mesh network composed of multiple access points.

17. The method of claim 12, wherein the messaging broker is a MQTT messaging broker.

18. The method of claim 12, wherein the messaging protocol is a MQTT messaging protocol.

\* \* \* \* \*